March 31, 1970     C. B. DAY     3,503,450
SPIRAL CONVEYOR BACKFILL ATTACHMENT FOR BULLDOZERS
Filed July 17, 1967     2 Sheets-Sheet 1
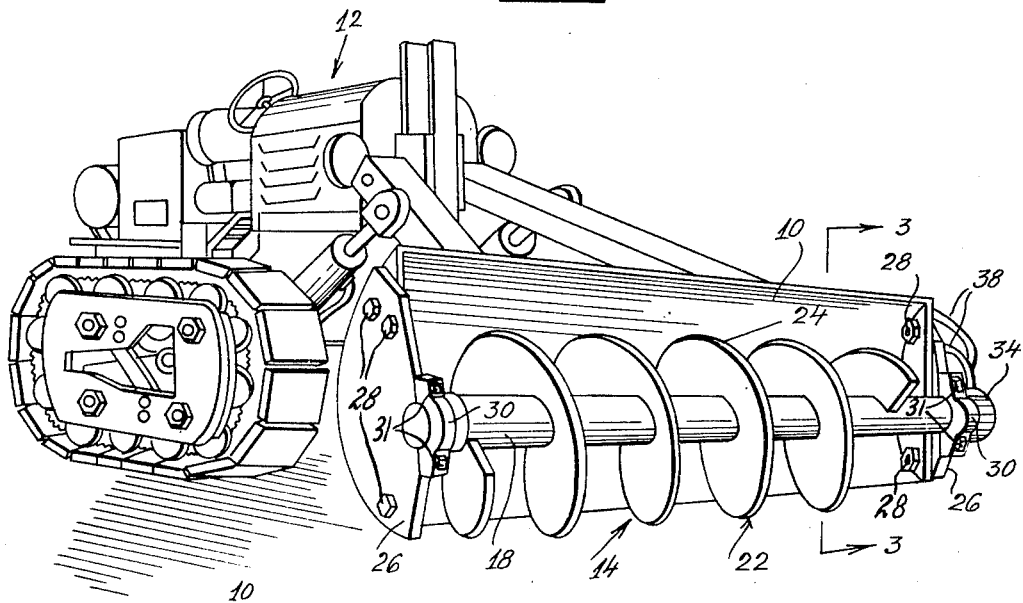
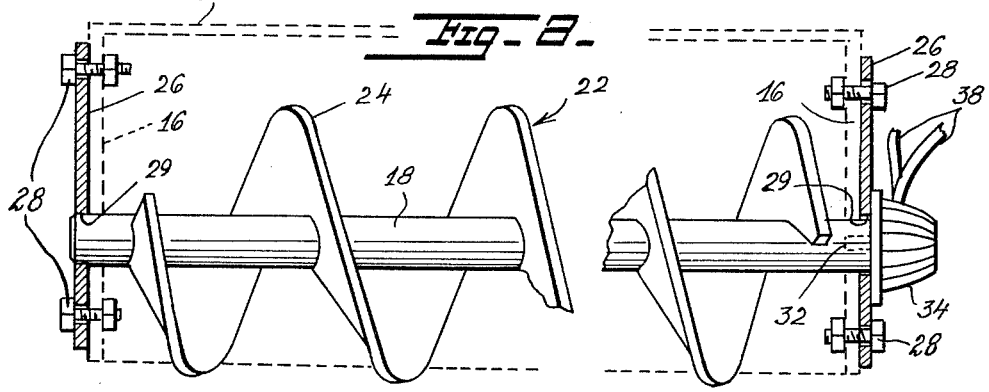
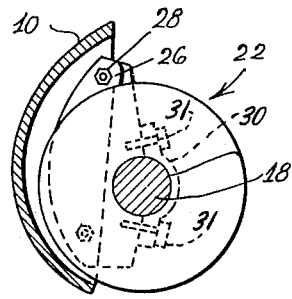
INVENTOR
Chester B. Day
BY Polachek & Saulsbury
ATTORNEYS

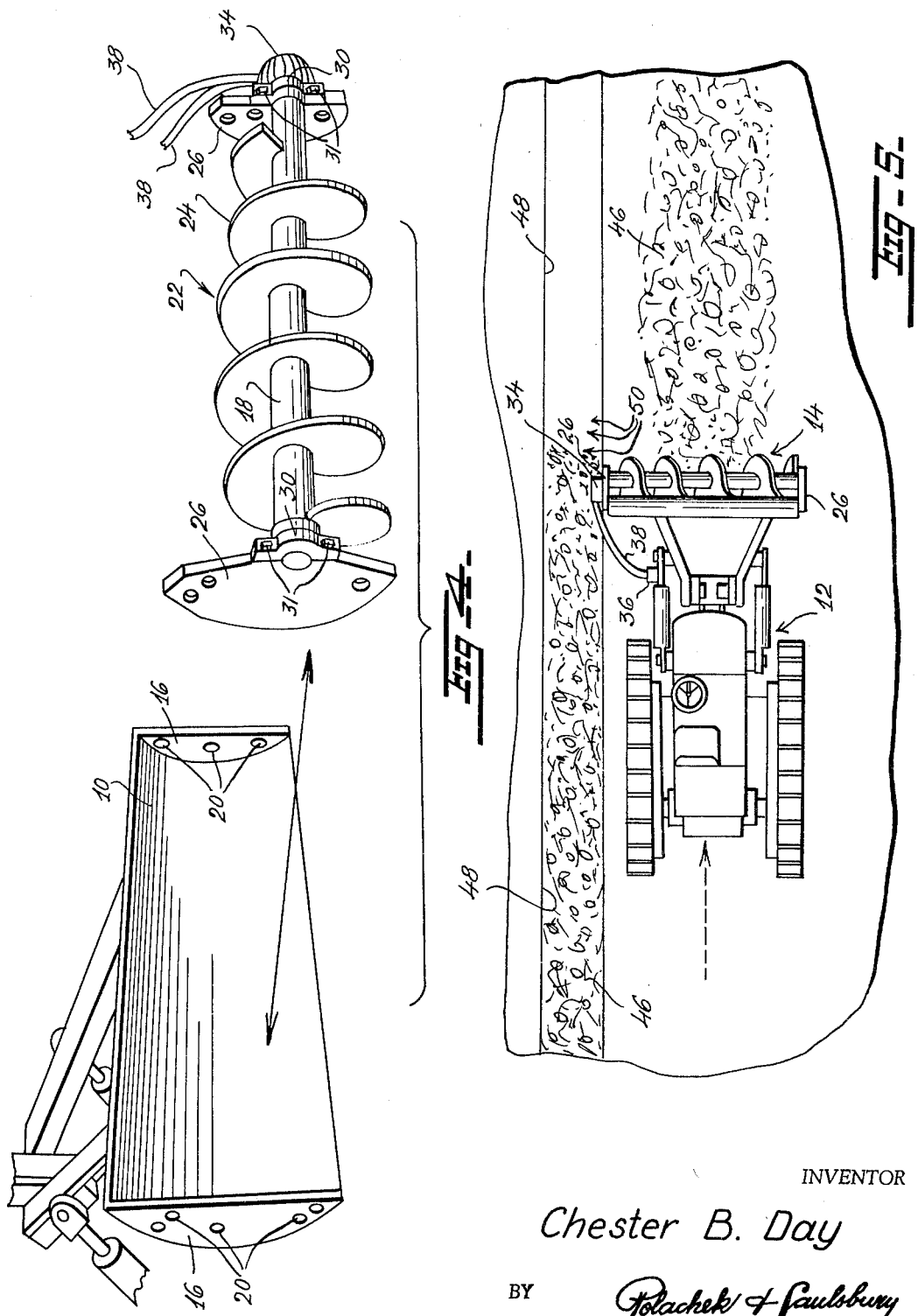

United States Patent Office 3,503,450
Patented Mar. 31, 1970

3,503,450
SPIRAL CONVEYOR BACKFILL ATTACHMENT
FOR BULLDOZERS
Chester B. Day, 101 Terry Blvd.,
Gering, Nebr. 69341
Filed July 17, 1967, Ser. No. 653,962
Int. Cl. E02f 3/81, 3/84; E01h 5/00
U.S. Cl. 172—71     1 Claim

ABSTRACT OF THE DISCLOSURE

A spiral conveyor backfill device for attachment to the front of a bulldozer for picking up a pile of dirt from the side of a ditch or the like, piled therealong, and conveying the dirt sidewise to refill the ditch. The device is rotated from mechanism on the backfill attachment.

BRIEF SUMMARY OF THE INVENTION

A spiral conveyor backfill device attached to the curved blade having end plates and mounted on the front of a bulldozer. The device consists of a shank or shaft with a spiral blade fixedly sleeved therearound, the shaft being rotatably journalled in bearing plates removably mounted on the end plates of the curved blade, the spiral blade elevating a dirt load and conveying it along the shaft to one end and discharging the load at said one end into a ditch or the like.

BRIEF DESCRIPTION OF SEVERAL VIEWS OF DRAWING

FIGURE 1 is a perspective view of a spiral conveyor backfill device embodying the invention shown attached to the front of a bulldozer.

FIG. 2 is a vertical sectional view through the center of the bulldozer blade and spiral conveyor backfill device, parts being shown broken away.

FIG. 3 is a cross-sectional view taken on the plane of the line 3—3 of FIG. 1.

FIG. 4 is a perspective view of the spiral conveyor backfill device removed from the blade of the bulldozer, and FIG. 5 is a top plan view of the spiral conveyor backfill device in action alongside a ditch.

DETAILED DESCRIPTION OF INVENTION

Referring in detail to the drawings, in FIGURE 1, a spiral conveyor backfill attachment embodying the invention is shown attached to an elongated blade 10 carried at the front of a bulldozer 12, the attachment being designated generally at 14. The blade 10 is arcuate in cross-section with end plates 16, 16 closing the ends thereof.

In accordance with the invention, the spiral conveyor backfill attachment 14 comprises an elongated solid round shaft 18. A continuous spiral blade 22 is sleeved around the shaft 18 and is fixedly secured thereto by welding or the like, the blade extending approximately end to end of the shaft, having a peripheral cutting edge 24.

The ends of the shaft 18 are journalled in bearing recesses 29 between bearing plates 26 fixed to the outer surfaces of the end plates by bolts 28 and curved straps 30 bolted to the edges of the bearing plates by bolts 31. One end of the shaft, the left hand end as seen in FIGS. 1 and 2, is operatively connected to the drive shaft 32 of a hydraulic motor 34 mounted upon the backfill attachment. The motor is operatively connected to a hydraulic pump 36 mounted on the bulldozer 12. By means of quick coupling hoses 38, 38, the shaft 18 and spiral blade 22 can be rotated in a backward or counterclockwise direction as viewed in FIG. 3.

In use, the bulldober 12 is positioned to the rear of the pile of dirt 46 removed from the ditch 48 and alongside and parallel to the ditch as shown in FIG. 5. When the bulldozer is driven forwardly and the blade 22 is operated the blade rotates backwardly or counterclockwise as viewed in FIG. 3, cutting into the pile of dirt and due to the shape of the spiral blade 22 and its cutting edge 24 thereof, moves and carries the dirt sidewise from the outer to the inner end of the shaft 18 in the direction of the arrows 50 shown in FIG. 5, dumping the dirt into the ditch 48, the shape of the blade 22 making the attachment self-discharging.

I claim:

1. A backfill attachment for a bulldozer having a hydraulic pump, said attachment comprising an arcuate shaped scraper blade closed at its ends by end plates, a rotatable spiral conveyor device for elevating and carrying dirt sidewise and discharging the dirt into a ditch or the like, said spiral conveyor device comprising a shaft bearing and a spiral blade sleeved around the shaft and fixed thereto, said blade providing a cutting edge adapted to engage the ground and extending from one end of the shaft to the other, bearing plates removably attached on the outer surfaces of the end plates and projecting forwardly from the leading edge of said bearing plates, said bearing plates having curved recesses in the leading edges thereof, the ends of said shaft being placed in said recesses, curved straps fixed to the leading edges of said bearing plates over the recesses to retain the shaft therewithin, the extremities of the shaft being journalled between said recesses and the curved bodies of the straps, and a hydraulic motor mounted on one of the removable bearing plates and operatively connected to the pump to be driven thereby and connected to the drive shaft to drive the shaft and the blade.

References Cited

UNITED STATES PATENTS

| 3,119,193 | 1/1964 | Herschberger. |
| 3,181,258 | 5/1965 | Duncan _____ 172—71 X |
| 3,334,429 | 8/1967 | Price _____ 37—43 |
| 3,375,878 | 4/1968 | Dorn _____ 172—71 |

ROBERT S. BAGWILL, Primary Examiner

STEPHEN C. PELLEGRINO, Assistant Eximner

U.S. Cl. X.R.

37—43, 143